United States Patent [19]

Miller

[11] 3,911,736

[45] Oct. 14, 1975

[54] MULTIPLE RANGE TORQUE MEASURING TOOL

[76] Inventor: Arthur Miller, 1602 Myrtlewood St., Costa Mesa, Calif. 92626

[22] Filed: May 22, 1974

[21] Appl. No.: 472,159

[52] U.S. Cl................................ 73/139; 73/139
[51] Int. Cl.² ........................................ B25B 23/14
[58] Field of Search........................... 73/136 A, 139

[56] References Cited
UNITED STATES PATENTS

| | | | |
|---|---|---|---|
| 2,256,478 | 9/1941 | Hill | 73/139 |
| 2,934,946 | 5/1960 | Engquist | 73/139 |
| 3,069,903 | 12/1962 | Larson | 73/139 |

OTHER PUBLICATIONS

A.P.C. Application of K. Schottle, Ser. No. 296,471, Published 5/1943.

Primary Examiner—Charles A. Ruehl
Attorney, Agent, or Firm—Gordon L. Peterson

[57] ABSTRACT

A torque measuring tool in which the twist of a torsion bar indicates the magnitude of applied torque comprising:

a. Means to utilize a variety of conventional wrenches of any desired length.
b. Interchangeable torsion bars for various torque ranges utilizing one scale with interchangeable numerical displays appropriate to each torque range.
c. Means to absorb excess torque, preventing accidental damage to the torsion bars and permitting unilateral readouts.
d. Interchangeable readout modes with very simple means of zeroing.

11 Claims, 14 Drawing Figures

MULTIPLE RANGE TORQUE MEASURING TOOL

BACKGROUND OF THE INVENTION

This invention relates to a general classification of tools usually referred to as torque wrenches. A great variety of these tools have been and are currently being used in the assembly of screw type fasteners.

The hand torque tools may be roughly divided into two general types--the flexible beam devices and the torsion bar devices.

Although the torsion bar principle has been applied to these tools, their commercial applications have been very limited due to the complexity and high cost of these devices, as well as their lack of versatility.

The predominantly used flexible beam torque wrenches suffer from several disadvantages:

1. Their accuracy depends upon very precise placement of the hand upon the wrench handle. Although this problem is somewhat alleviated by the use of a pivoted handle at the end of the beam, great care must be exercised during the torqueing operation to prevent the pivoted handle from touching the beam other than at the pivot pin. Should the handle touch the beam at either side of its pivot, very significant variations in applied torque vs, indicated torque will result.

2. The long flexible beam results in a large radius of swing about the axis of the fastener which limits the use of the beam in terms of accessibility.

3. Operator dexterity must be relied upon to prevent overstressing and therefore permanently deforming or fracturing the flexible beam.

4. The majority of flexible beam torque wrenches offer no protection to the operator in the event of a fracture of the beam.

SUMMARY OF THE INVENTION

The present invention provides a torque measuring tool which solves all of the above noted disadvantages and problems. The tool utilizes the twist of a torsion bar to measure the magnitude of torque applied to a screw type fastener, whereby the torque may be applied by a variety of conventional wrenches of any desired length without affecting the readout accuracy of the tool. Typically, my tool may be used with a square drive ratchet wrench, an open ended wrench, a box wrench, or an adjustable spanner, whereby the drive bit of my tool accepts conventional square drive sockets or any tools adapted to a conventional square drive.

The present invention is adaptable to a variety of applications where restricted working space requires a short radius of swing about the axis of the fastener, and where the type and length of the wrench is to be determined by operator preference, since the tool will correctly indicate the magnitude of applied torque regardless of the length of the wrench handle or of the position of the operator's hand on said handle.

The present invention provides protection against fracture of the torsion bar by transferring inadvertently applied excess torque to a torsion tube which surrounds the torsion bar, said tube having a significantly higher resistance to torsional deflection than the torsion bar.

The present invention further provides interchangeable torsion bars with different torque ranges, said torsion bars operating within the same angular displacement and utilizing a common incremental scale which is equipped with interchangeable numerals appropriate to the torque range of each torsion bar.

To further extend the versatility of the tool, I have provided two separate readout modes which are readily interchangeable within the basic tool configuration. Both readout modes can be used with each of the interchangeable torsion bars. The direct readout mode utilizes an indicating and torque transfer pin coupled to a torsion bar to indicate directly the magnitude of applied torque in terms of angular displacement upon an incremental scale; the geared readout mode works with a short torque transfer pin coupled to a drive gear which engages a geared pointer with a suitable gear ratio to increase the angular displacement of said geared pointer with respect to the angular displacement of the torsion bar, providing a more compact tool configuration. The principle of torque transfer to the torsion tube is the same in both readout modes and is accomplished by the indicating and torque transfer pin of the direct readout mode, and by the short torque transfer pin of the geared readout mode.

The present invention further provides a unilateral readout capability, in either the direct or the geared readout modes, which virtually eliminates stress reversal within the torsion bar and simplifies the numerical display. A unilateral readout is deemed practical since fasteners almost exclusively utilize right hand threads, and the requirements for the application of proper torque are invariably expressed in terms of assembly instructions only. However, as I do not wish to be limited to a unilateral readout in either the direct or the geared readout modes, I have provided a multilateral readout capability as well.

The present invention further provides very simple means of zeroing the torque scale by rotating the scale carrier about the axis of the torsion tube and aligning it with the torque transfer and indicating pin in the direct readout mode, or with the geared pointer in the geared readout mode. Once aligned or zeroed, the scale carrier of either mode is clamped securely to the torsion tube by means of a set screw or similar clamping means.

The present invention further provides a tool which is eminently suitable to the application of known mass production techniques; it further provides for efficient utilization of materials with a minimum of waste, in terms of stock sizes and type of material, such as the separation of the small diameter torsion bar from the relatively large diameter sockets, thereby permitting the utilization of the most suitable material and heat treatment for each of these elements.

DESCRIPTION OF THE PREFERRED EMBODIMENT

Figure 3:
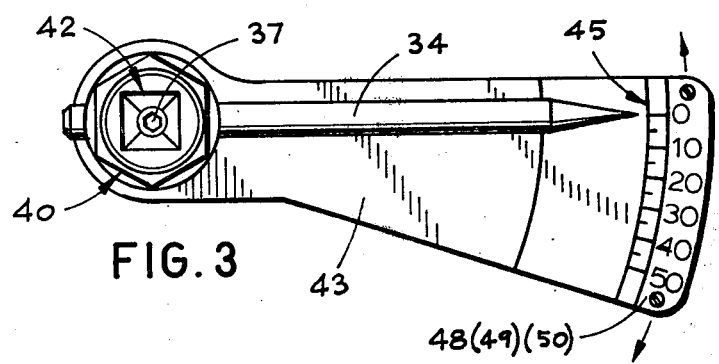
FIG. 3 is an elevation of the multiple range torque measuring tool.
Figure 1:
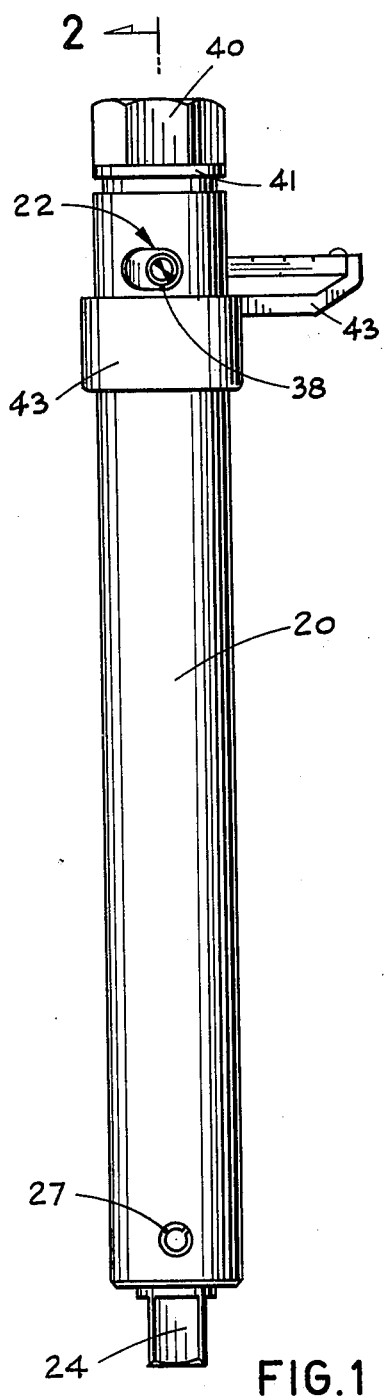
FIG. 1 is a side view of the multiple range torque measuring tool.
Figure 2:
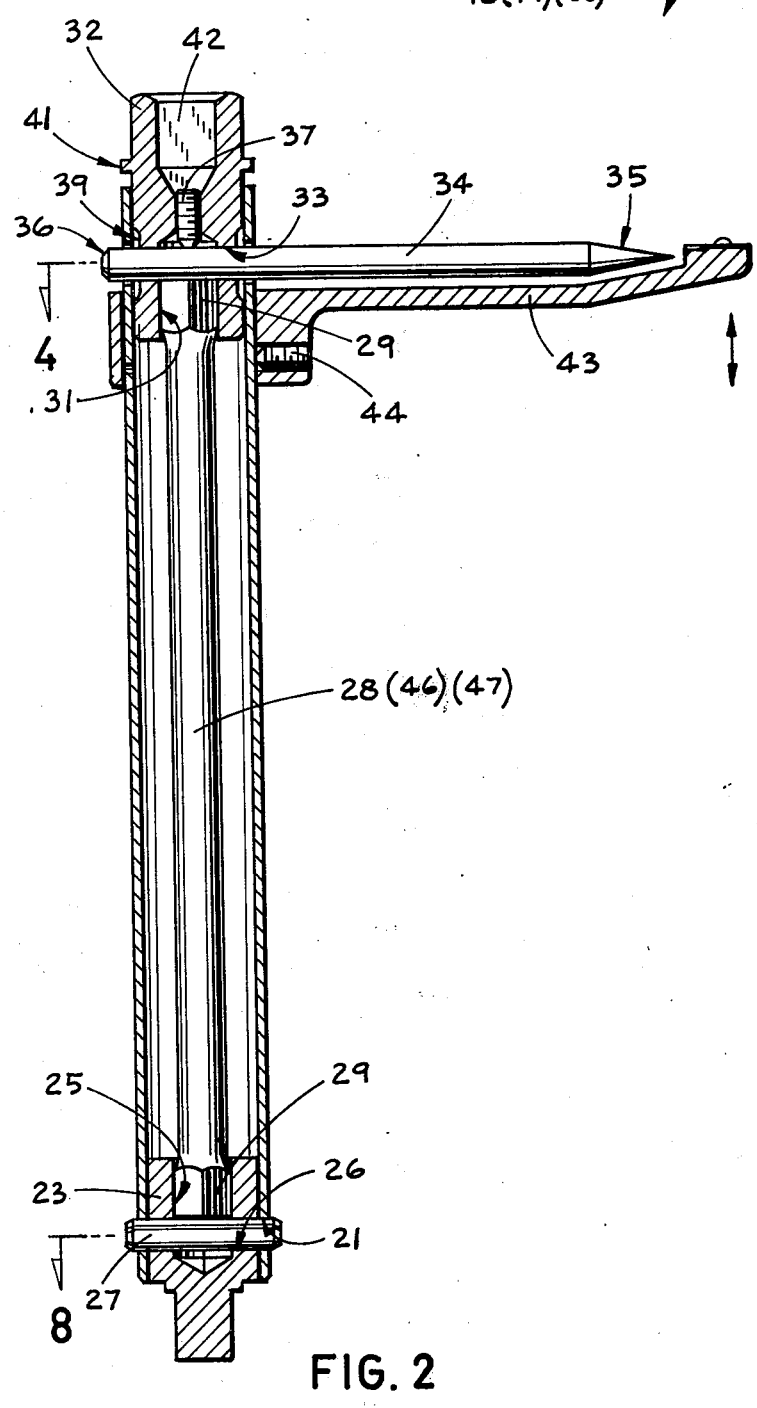
FIG. 2 is a sectional view of the multiple range torque measuring tool taken along line 2 of FIG. 1.
Figure 4:
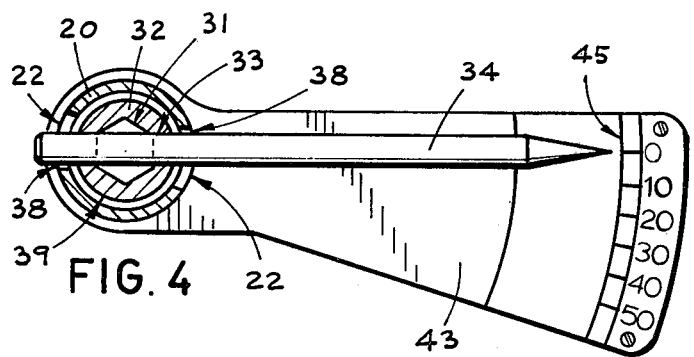
FIG. 4 is a sectional view taken along line 4 of FIG. 2.

Referring to the drawings, the multiple range torque measuring tool as seen in FIGS. 1, 2, and 3 is comprised of the torsion tube or torsion limiting member 20, essentially a length of commercially available cold drawn carbon steel tubing with a drilled through cross hole 21 on centerline with the torsion tube near one end, and two transverse opposing slots 22 thru both sides of the tube near the other end. The opposing slots 22 may be punched in a stamping die, or they may be milled at the same time with an end mill of a slightly larger diameter than that of an indicating and torque transfer pin 34 described below. First a plunge cut is made thru both sides of the torsion tube 20 on centerline with and parallel to the cross hole 21. Then the torsion tube 20 is indexed around (rotated) through the desired angle, 18.5° in the preferred embodiment, and the end mill is withdrawn having finished the milling operation. Standard commercial tolerances of −.005 inches on the ID and +.005 inches on the OD of the tube with a minimum wall thickness of 0.063 inches are quite acceptable.

Inside the torsion tube 20 is a close fitting drive bit 23, essentially a round screw machine part of hardened alloy steel with a conventional square drive 24 concentric with the OD at one end, and with a hexagonal hole 25 concentric with the OD at the other end. A hole 26 is drilled through the drive bit on centerline with the OD and at right angles to any one flat surface of the hexagonal hole, said hole 26 having the same diameter as the cross hole 21 in the torsion tube. The drive bit 23 is fastened to the tube 20 by means of a rollpin 27.

Into the hexagonal hole 25 is inserted with a close fit one end of a torsion bar 28, said torsion bar having a diameter tolerance of at least ±.001 inches, and being ground out of hardened alloy-steel hexagonal cold rolled bar stock 29, the size of which corresponds to the hexagonal hole 25 in the drive bit 23. The hexagonal end 29 of the torsion bar 28 rests against the roll pin 27. The other hexagonal end 29 of the torsion bar 28 is inserted with a close fit into a corresponding hexagonal hole 31 of a drive socket 32, said hexagonal hole being concentric with the OD of said drive socket, whereby both hexagonal holes 25 and 31 are of sufficient depth to permit staking or swaging of the sockets over the torsion bar, if a tight fit is desired without having to hold close tolerances.

The drive socket 32, essentially a round screw machine part of hardened alloy steel, fits inside the torsion tube 20 with an appropriate clearance fit which should permit free and easy, rotation under all tolerance conditions. A hole 33 is drilled through the drive socket on centerline with the OD and at right angles to any one flat surface of the hexagonal hole 31 to provide for proper registry and interchangeability of the torsion bar 28 with respect to the cross hole 21 and the slot 22 of the torsion tube 20.

Into the hole 33 is inserted the indicating and torque transfer pin 34, said element or pin being a relatively long screw machine part of standard round stock of corrosion resisting steel having one pointed or conical end 35 and a chamfer 36 at the other end, and being fastened to the drive socket 32 by means of the set screw 37 so that the chamfered end 36 protrudes out of the slot 22, whereby the overall length of the torsion bar 28 is a determining factor in terms of the axial positioning of the pin 34 in relation to the slots 22. A certain amount of clearance 38, axial as well as angular, between the pin 34 and the slots 22 should be maintained, particularily while the tool is working, to minimize friction. During assembly of the tool the indicating and torque transfer pin 34 is positioned in line with the roll pin 27 by means of the above described proper registry of the cross hole 21, the slots 22, the drive bit 23, the drive socket 32, and the torsion bar 28, whereby the ends of the slots 22 of the torsion tube 20 permit the indication of applied torque by the indicating and torque transfer pin 34 only if said torque is applied in one direction (clockwise), resulting in a unilateral readout.

The drive socket 32 has a relief diameter 39 which eliminates any possibility of rotational interference likely to develop during manufacturing or in use at the ends of the slots 22.

The head of the drive socket 32 has a milled or cold headed external hexagon 40 concentric with the OD and dimensioned to correspond with a standard wrench size, such as ¾ inches across flats. If the part were to be milled rather than cold headed two milled flats of the same dimension would suffice, but would be less versatile as the flats would exclude the use of a box wrench. The hexagon head 40 terminates in a flange 41 at the some distance above the torsion tube 20. Inside the hexagon head 40 of the drive socket 32 there is a square hole 42, concentric with the OD, dimensioned and configured to accept a conventional square drive socket wrench of some standard dimension, such as ⅜ inches between flats.

A scale carrier 43, essentially an aluminum alloy die casting or alternately a high strength plastic molding, fits over the torsion tube 20 and is free to rotate about the axis of the torsion tube 20, as well as being free to slide axially along the torsion tube 20 as indicated by the arrows in FIGS. 2 and 3. The set screw 44 fastens or clamps the scale carrier 43 securely to the torsion tube 20 in an infinite number of positions, either angular or axial with respect to the indicating and torque transfer pin 34 and its conical end 35, whereby the axial position of the scale carrier 43 is adjusted to shield and protect the conical end 35 of the indicating and torque transfer pin 34.

The scale carrier 43 has an engraved or a die cast incremental scale 45 which is proportional to the angular displacement of the torsion bar 28 as indicted by the indicating and torque transfer pin 34. In the preferred embodiment this angular displacement is 17.5° and is subdivided into 5 major and equally spaced increments of 3.5° each, each of said major increments being subdivided into two increments of 1.75° each. The somewhat larger angle of the opposing slots 22, 18.5° in the preferred embodiment, limits the maximum relative displacement of the torsion bar 28 with respect to the torsion tube 20, the 1° difference being a guarantee of accurate maximum torque indication without torsion tube interference.

Figure 10:
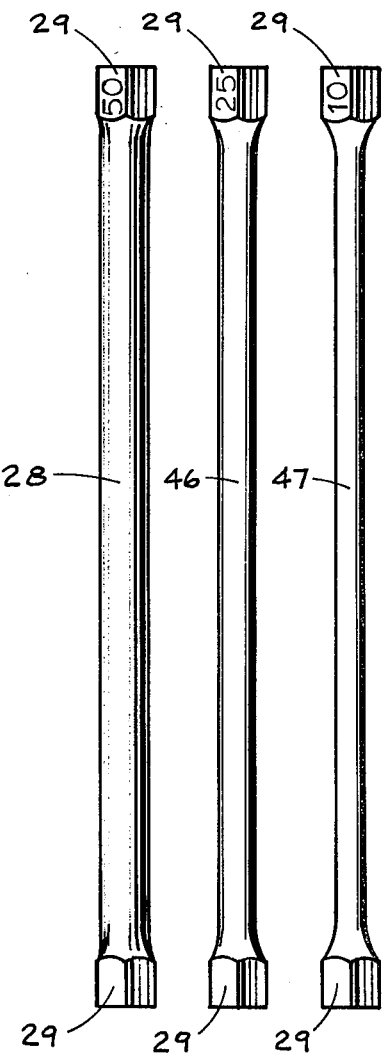
FIG. 10 is a plan view of three interchangeable torsion bars.

Turning now to FIG. 10 we see the torsion bar 28 removed from the tool and adjacent to two interchangeable torsion bars 46 and 47 of the same overall length and with the same hexagonal ends 29, having been ground out of the same hexagonal bar stock, but having different diameters and therefore different torque values or ranges within the same angle of torsional deflection which is equivalent to an angular displacement of 17.5° in the preferred embodiment. Torsion bar 28 is labeled in FIG. 10 with the numeral 50 which indicates its torque range of 0 to 50 ft-lbs. The torsion bars 46 and 47 are labeled with their respective torque ranges of 0 to 25 ft-lbs and 0 to 10 ft-lbs. The diameter of each interchangeable torsion bar may be computed by means of well known methods as a function of effective length, torsional moment, angle of torsional deflection, polar moment of inertia, torsional modulus of elasticity, and acceptable unit stress. I do not, however, wish to be limited solely to the 3 interchangeable torsion bars described above, since any number of interchangeable torque range combinations may be readily adapted to this concept.

Figure 9:
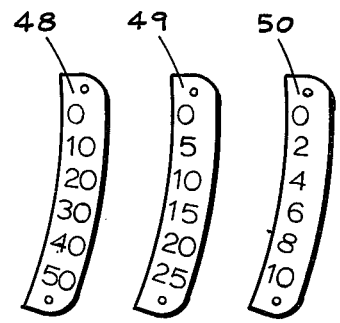
FIG. 9 is an elevation of three typical numerical displays, with the numerals representing units of torque such as ft-lbs.

Corresponding to the torque ranges of the above described torsion bars, we see illustrated in FIG. 9 the three numerical displays 48, 49, 50, said numerical displays being in the form of decal plates, each of which can be affixed to the scale carrier 43 adjacent to the incremental scale 45, so that each interchangeable torsion bar has its corresponding and interchangeable numerical display. Alternately, the three numerical displays of the preferred embodiment could be combined and displayed concurrently. This modification of the preferred embodiment could be useful where a rapid exchange of the torque ranges by the operator is a prime consideration.

Figure 11:
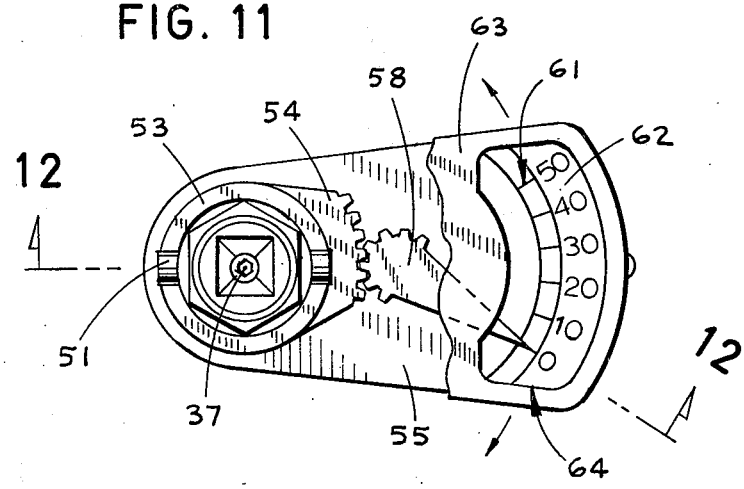
FIG. 11 is a fragmentary elevation of a torque measuring tool having the geared readout mode.
Figures 12, 13:
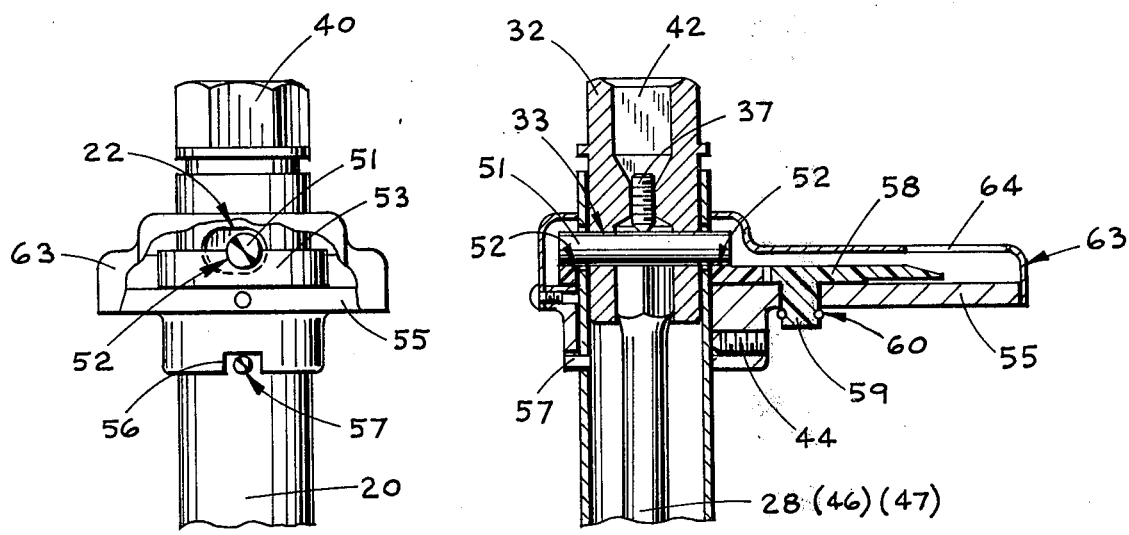
FIG. 12 is a fragmentary sectional view along lines 12-12 of FIG. 11.
FIG. 13 is a fragmentary side view of the torque measuring tool having the geared readout mode.

To further extend the versatility of the tool, the scale carrier 43, the numerical displays 48, 49, 50, and the indicating and torque transfer pin 34, can be readily exchanged for a geared readout mode of a more compact configuration, as illustrated in FIGS. 11, 12, and 13.

The geared readout mode is comprised of the torque transfer pin 51, essentially a short screw machine part of corrosion resisting steel round bar stock, which protrudes out of the slots 22 on either side of the torsion tube 20 and is fastened inside the hole 33 of the drive socket 32 by the set screw 37. The torque transfer pin 51 drivingly engages the grooves 52 in the round collar 53 of the drive gear 54, essentially a molding of high strength plastic, said drive gear being rotatably and slidably mounted on the torsion tube 20. The drive gear 54 is supported and trapped by the geared scale carrier 55, essentially an aluminum alloy die casting or alternately a high strength plastic molding, which fits over the torsion tube 20 and is free to rotate about the axis of the torsion tube 20 as indicated by the arrows in FIG. 11 within a certain angular displacement limited by the cutout 56 and the roll pin 57 which is pressed into a hole of the torsion tube 20, said roll pin also limiting, with a certain amunt of clearance, the axial movement of the geared scale carrier 55. The set screw 44 fastens or clamps the geared scale carrier 55 securely to the torsion tube 20 in an infinite number of angular positions within the limits allowed by the cutout 56 and the roll pin 57. The geared pointer 58, essentially a molding of high strength plastic has a round shaft 59 which protrudes thru and is rotatably mounted in a corresponding hole in the geared scale carrier 55, said geared pointer 58 being retained by the retaining ring 60 and engaging the drive gear 54 with an appropriately matching gear, the ratio of which is chosen to obtain an angular displacement of the geared pointer the order of 65° to correspond with the 17.5° angular displacement of the drive gear 54 and of ther torque transfer pin 51 and therefore of the torsion bar 28. The geared scale carrier has an engraved or die cast incremental scale 61 arranged about the axis of the geared pointer shaft 59, and interchangeable or concurrently readable numerical displays 62 for the different torque ranges as described above. To protect the gears, a cover 63 is fitted over and affixed to the geared scale carrier 55, said cover having a cutout for the torsion tube 20, and an appropriately shaped cutout 64, designaed to expose the tip of the geared pointer 58 and the scale 61 with its numerical display 62; said cover 63 being of aluminum alloy or equivalent and being stamped and formed.

Figure 14:
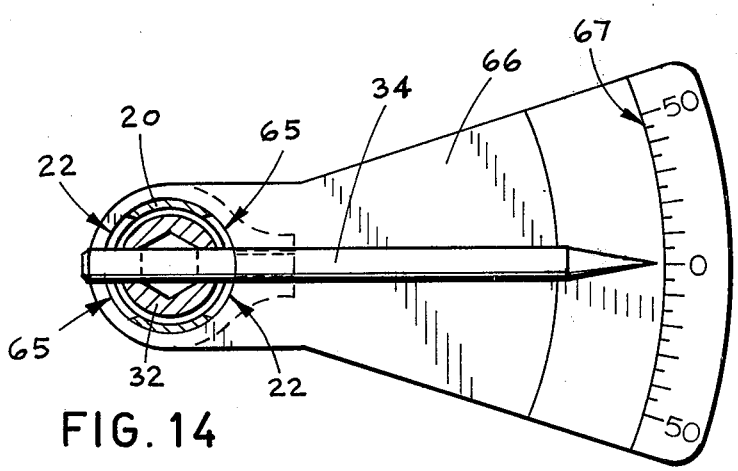
FIG. 14 is a sectional view similar to FIG. 4 illustrating a modification of the present invention.

As I do not wish to be limited to unilateral readouts in either the direct indicating or the geared readout modes, I have provided a multilateral readout as exemplified by the illustration in FIG. 14, said multilateral readout, in either the direct indicating or the geared readout modes, requires a change 65 in the length of the opposing slots 22 in the torsion tube 20; this increased slot length allowing the torsion bar 28 to deflect 18.5 degrees to either side of its static or zero position, determined by the cross hole 21, before the indicating and torque transfer pin 34 contacts the ends of the opposing slots 22 in the torsion tube 20. The purpose and function of the illustrated scale carrier 66 is identical to that of the scale carrier 43 in all respects with the exception of the multilateral scale 67 and its appropriate multilateral numerical display.

Figure 5:
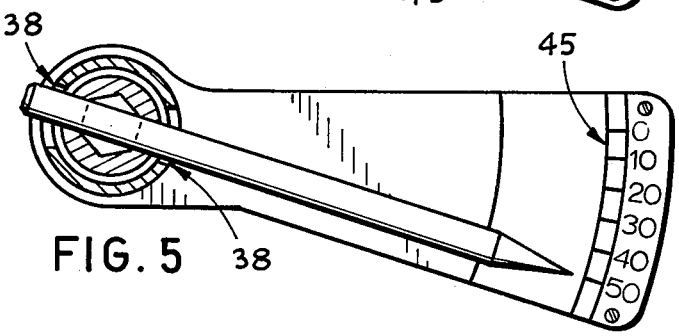
FIG. 5 is a sectional view taken along line 4 of FIG. 2 illustrating the twist of the torsion bar and the maximum torque indication.

In operation the tool, as described above, is used with conventional sockets which are attached to the square drive 24 of the drive bit 23, and with any one of a number of conventional wrenches of any desired length attached to the drive socket 32, either externally to the hexagon head 40, or internally to the square drive 42. The application of torque results in a proportional deflection of the torsion bar 28 with respect to the torsion tube 20 and the affixed scale carrier 43 with the scale 45 and the appropriate numerical display, the angle of said torsional deflection being indicated by the indicating and torque transfer pin 34, said pin 34 being out of contact with the slots 22 within the range of the incremental scale 45, as shown by the clearance 38 in FIG. 5. The function of the torsion tube 20, when the tool is operated within the range of said incremental scale 45, is to support the scale carrier 43 and to resist bending loads which might be imposed by the operator's hand which counters the force applied at the wrench handle.

Figure 6:
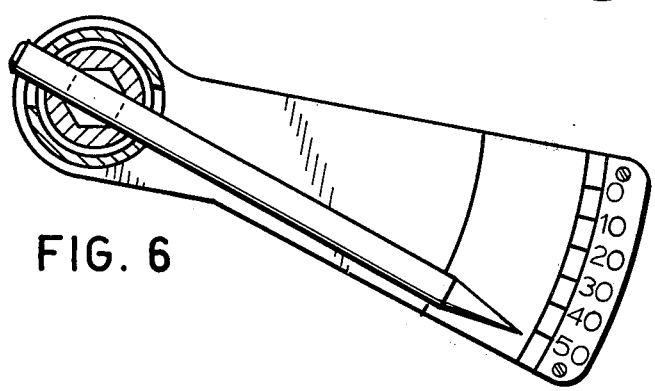
FIG. 6 is a sectional view taken along line 4 of FIG. 2 illustrating the jointly twisting torsion bar and torsion tube when the torque is applied in a clockwise direction. The angular displacement of the torsion tube is shown exaggerated.
Figure 7:
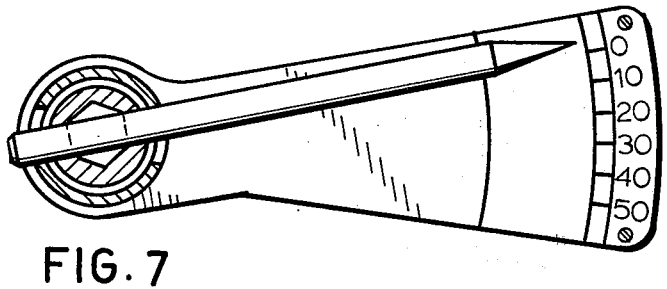
FIG. 7 is a sectional view taken along line 4 of FIG. 2 illustrating the jointly twisting torsion bar and torsion tube when the torque is applied in a counterclockwise direction. The angular displacement of the torsion tube is exaggerated.
Figure 8:
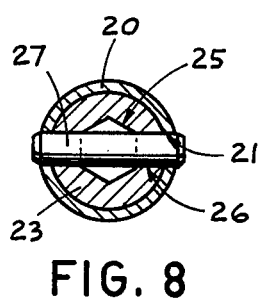
FIG. 8 is a sectional view taken along line 8 of FIG. 2.

The application of excessive torque, or torque outside the range of said incremental scale 45, in either the clockwise or counterclockwise directions results in solid contact between the indicating and torque transfer pin 34 and the respective ends of the opposing slots 22, said solid contact transmitting the force to the torsion tube 20 and twisting said tube jointly with said torsion bar in the direction of the applied torque, as illustrated by FIGS. 6 and 7, whereby the roll pin 27 resists the torque which is applied to said torsion tube.

To adequately protect the torsion bars, particularly those with the lower torque values, the specific deflection ratio of torsion tube to torsion bar in units of energy per degree should be the order of 25 to 1, said ratio being based upon the torsion bar with the highest torque value which is expected to be utilized in the system.

Thus any torsion bar in the system is well protected against accidental or careless application of excessive torque outside its torque range. The torsion tube further protects the operator in the unlikely event of a fracture of a torsion bar. The functioning of the multiple range torque measuring tool when used outside its torque range, in terms of applied torque, will approximate that of a stout socket wrench extension. Readout accuracy of the tool as described above is entirely adequate, with internal friction causing less than ½ of one percent inaccuracy of the maximum scale reading, the major criterion of inherent accuracy being the tolerance of the torsion bar diameters.

Having shown and described the exemplary embodiments of my invention, I do not desire to be limited to the exact details of construction shown and described, for obvious modifications will occur to a person skilled in the art, without departing from the scope of this invention.

I claim:
1. A torque measuring tool comprising:
   a. a torsion element with tool receiving means at one end and wrench receiving means at the opposite end;
   b. a torsion tube coaxial with and surrounding said torsion element, one end of said torsion tube being affixed to said tool receiving means of said torsion element;
   c. means limiting relative angular displacement between said wrench receiving means of said torsion element and said torsion tube, said limiting means including an indicating element driveable by said torsion element and a stop fixed to said torsion tube and engageable with said indicating element;
   d. a scale carrier with a scale having indicia thereon cooperable with said indicating element to provide an indication of the applied torque, said scale carrier being rotatably and slidably mounted on said torsion tube; and
   e. means to affix said scale carrier to said torsion tube in an infinite number of positions, angular and axial, relative to said torsion tube and to said indicating element.

2. A tool as defined in claim 1 wherein said one end of said torsion tube is releasably affixed to said tool receiving means of said torsion element whereby said torsion element can be replaced with a second torsion element.

3. A torque measuring tool according to claim 2 in which said wrench receiving means includes coaxial external and internal wrench receiving means.

4. A torque measuring tool comprising:
   a torsion bar having opposite ends, both of said ends having symmetrical and identical cross sections other than circular;
   a drive bit having tool engaging means and a hole;
   a drive socket having tool receiving means and a hole;
   one of the ends of said torsion bar being inserted into said hole in said drive bit and the other of said ends of said torsion bar being inserted into the hole in said drive socket;
   a torsion tube coaxial with said torsion bar, one end of said torsion tube being affixed to said drive bit with the tool engaging means thereof extending out of said torsion tube;
   an elongated indicating and torque transfer pin mounted on and extending transversely through said drive socket;
   said torsion tube having at least two generally opposing slots adjacent the drive socket;
   means for affixing said pin to said drive socket, said pin protruding outwardly through said opposing slots on both sides of said torsion tube with some axial clearance between said pin and each of said slots, said pin being engageable with at least one of the ends of said slots to limit the relative angular displacement between said drive socket and said torsion tube;
   a scale carrier having a scale thereon; and
   means for mounting the scale carrier on the torsion tube in an infinite number of angular and axial positions relative to the torsion tube and relative to said pin, one end of said pin being cooperable with said scale to provide an indication of torque.

5. A torque measuring tool comprising:
   a torsion element having first and second axially spaced regions, said torsion element being adapted to transmit torque from one of said regions to the other of said regions;
   a torsion limiting member extending along said torsion element between said first and second spaced regions;
   means for drivingly connecting said torsion limiting member and said first region of said torsion element, said second region of said torsion element being free to be angularly displaced relative to said torsion limiting member;
   a scale carrier;
   means for mounting said scale carrier on said torsion limiting member;
   indicating means drivingly connected to said torsion element at said second region and cooperable with said scale carrier to provide an indication of the torque on said torsion element;
   said indicating means including a pin drivable by said torsion element and projecting generally outwardly from said torsion element; and
   said torsion limiting member having a shoulder in the path of movement of said pin, said pin and said shoulder being cooperable to limit the torque which can be applied to the torsion element.

6. A tool as defined in claim 5 wherein said indicating means includes a pointer pivotally mounted on said scale carrier and gear means for drivingly coupling said pin and said pointer.

7. A tool as defined in claim 5 wherein said scale carrier has a scale thereon and said pin extends to a location adjacent said scale whereby said pin provides a pointer for cooperation with said scale to provide an indication of the torque on said torsion element.

8. A tool as defined in claim 5 wherein said mounting means for said scale carrier can mount said scale carrier at any one of a plurality of different positions 9. A tool as defined in claim 5 wherein said torsion limiting member includes a tube and at least a portion of said torsion element lies within said tube.

10. A tool as defined in claim 9 wherein said tube has at least one slot therein, said pin projecting through said slot, said shoulder defining one end of said slot.

11. A tool as defined in claim 5 including means on said one region for releasably drivingly engaging an external member and means on said other region for releasably drivingly engaging a second external member.

* * * * *